United States Patent [19]
Boston

[11] Patent Number: 5,992,498
[45] Date of Patent: Nov. 30, 1999

[54] REMOVABLE VEHICLE WINDOW SECURITY SCREEN SYSTEM

[76] Inventor: Lorenzo Boston, P.O. Box 6876, San Francisco, Calif. 94142

[21] Appl. No.: 08/870,061

[22] Filed: Jun. 5, 1997

[51] Int. Cl.[6] ........................................................ B60J 1/20
[52] U.S. Cl. ................ 160/370.22; 160/105; 160/368.1; 160/370.21; 160/382; 296/97.7
[58] Field of Search .............................. 160/105, 368.1, 160/370.21, 370.22, 382, 400, 404, DIG. 2, DIG. 10; 296/97.7, 97.8

[56] References Cited

U.S. PATENT DOCUMENTS

| | | | |
|---|---|---|---|
| 1,461,478 | 7/1923 | Daniels | 160/370.22 X |
| 1,509,450 | 9/1924 | Sweeney | 160/DIG. 2 X |
| 1,571,019 | 1/1926 | Lucas | 160/DIG. 2 X |
| 2,017,539 | 10/1935 | Kaplan | 160/354 |
| 2,851,303 | 9/1958 | McQueen | 160/370.22 X |
| 3,338,293 | 8/1967 | Hohmann | 160/370.21 |
| 3,763,917 | 10/1973 | Antinone | 160/368.1 X |
| 3,960,195 | 6/1976 | Marchbanks | 160/105 |
| 4,249,589 | 2/1981 | Loeb | 160/368.1 |
| 4,335,773 | 6/1982 | Masi | 160/370.22 X |
| 4,398,586 | 8/1983 | Hall | 160/105 |
| 5,036,898 | 8/1991 | Chen | 160/370.22 X |
| 5,205,332 | 4/1993 | Lii | 160/370.22 X |
| 5,423,589 | 6/1995 | Pank | 160/370.21 X |
| 5,562,142 | 10/1996 | Ziel et al. | 160/370.21 |
| 5,597,028 | 1/1997 | Rolf et al. | 160/368.1 X |

*Primary Examiner*—Daniel P. Stodola
*Assistant Examiner*—Bruce A. Lev

[57] ABSTRACT

A removable vehicle window security screen system includes a reticulated netting formed to a shape of a window opening, a resilient border strip secured to the netting, a plurality of apertures in a window frame, and a plurality of fasteners for projecting through the border strip into the apertures. The fasteners are insertable only from an inside of the vehicle thereby allowing the user to lock the vehicle while stationary without fear of theft.

5 Claims, 3 Drawing Sheets

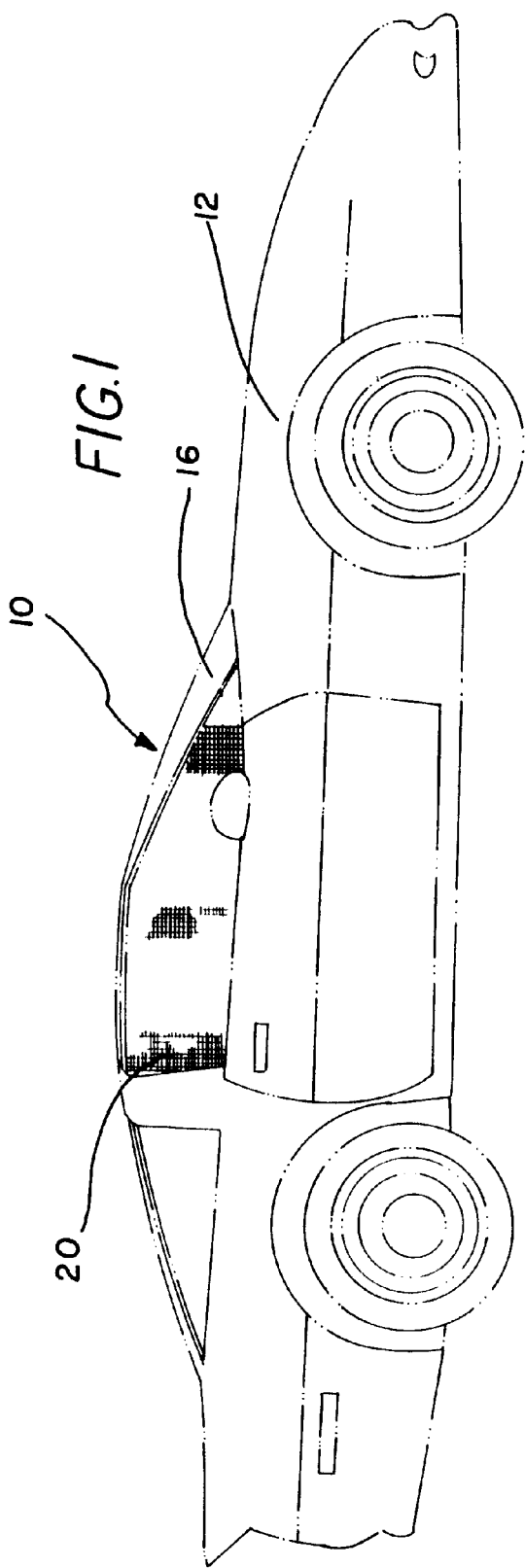
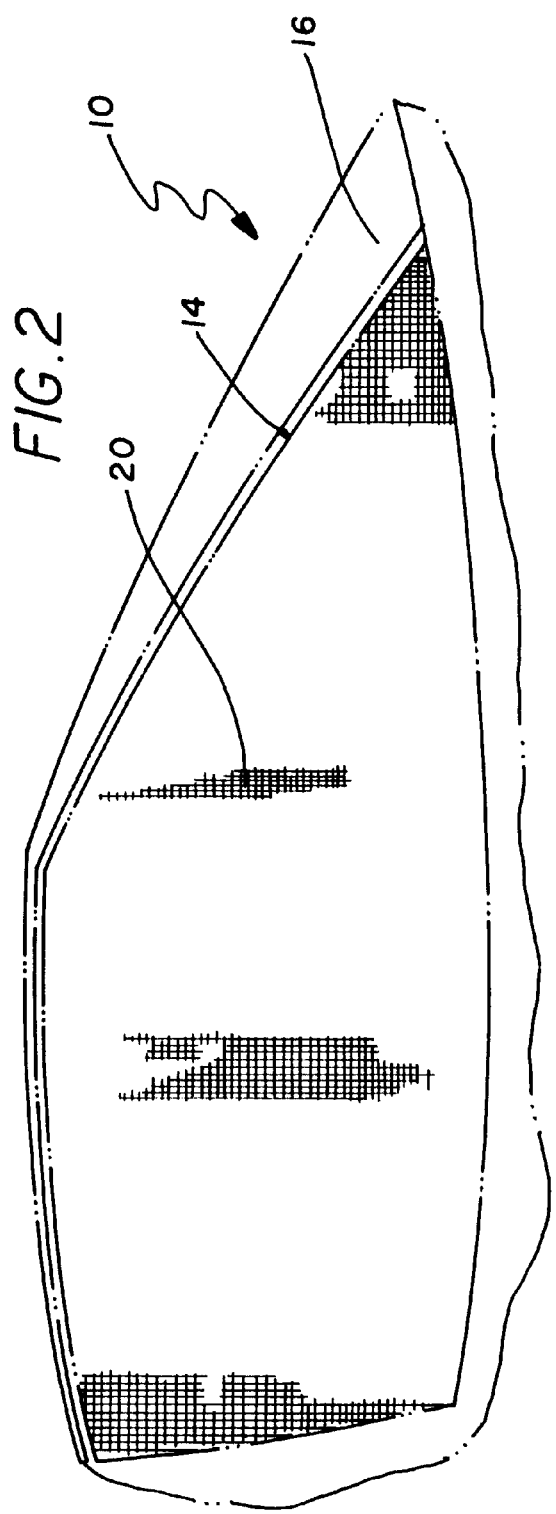

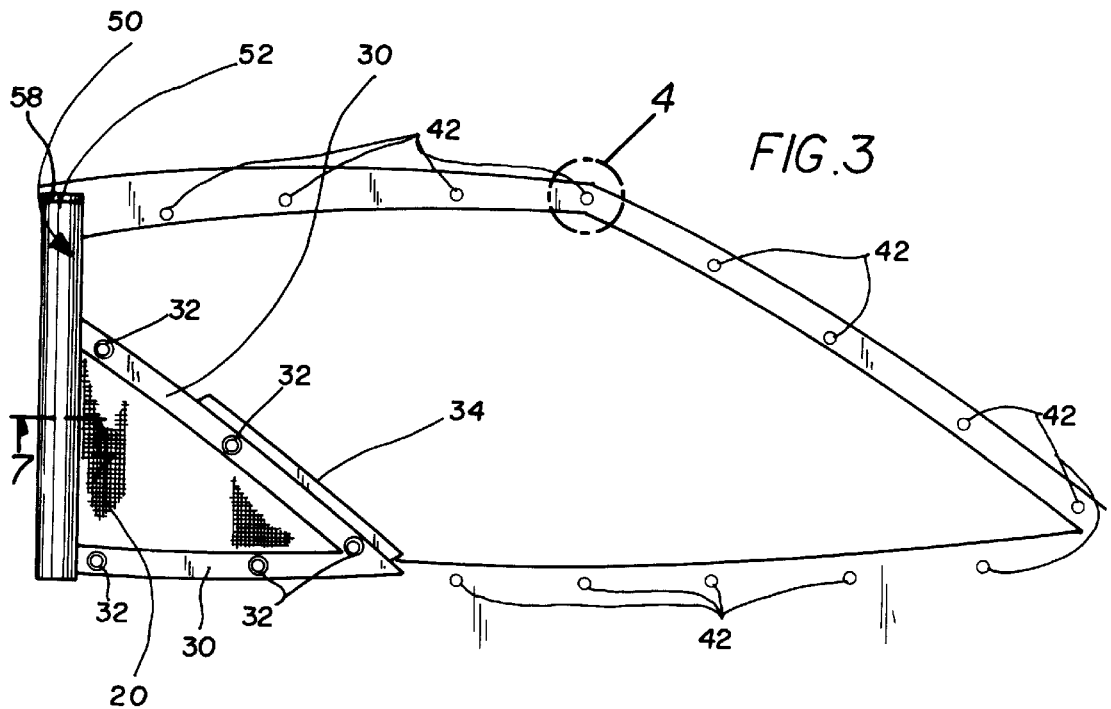
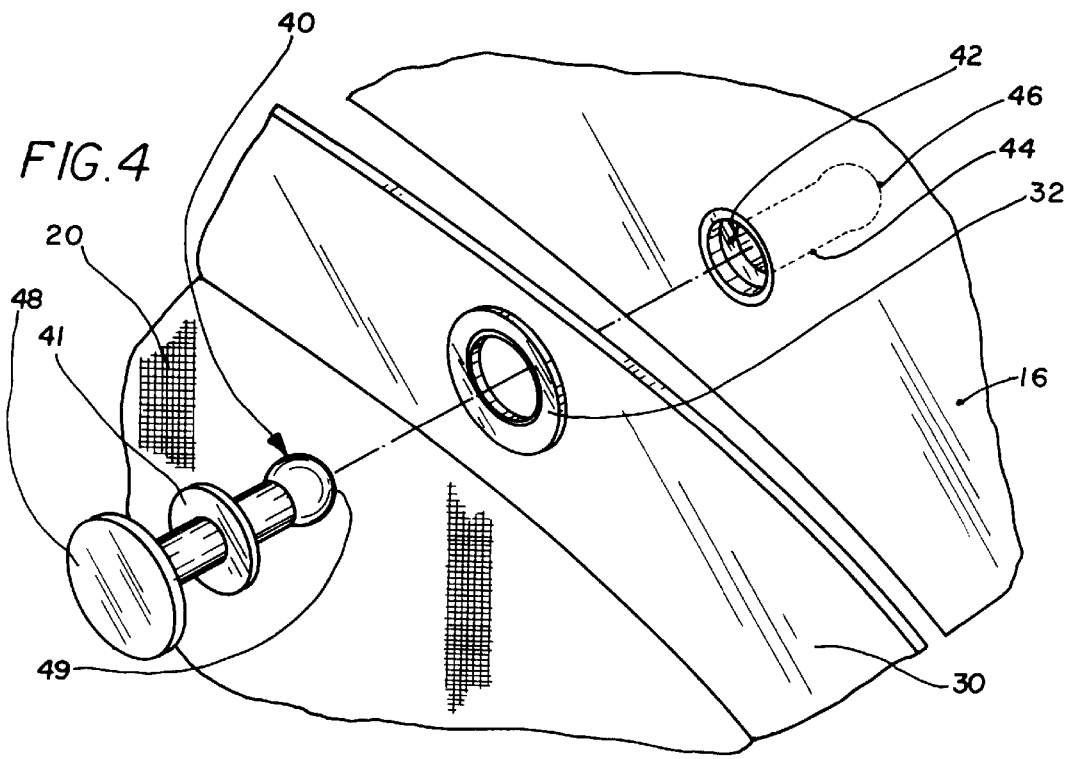

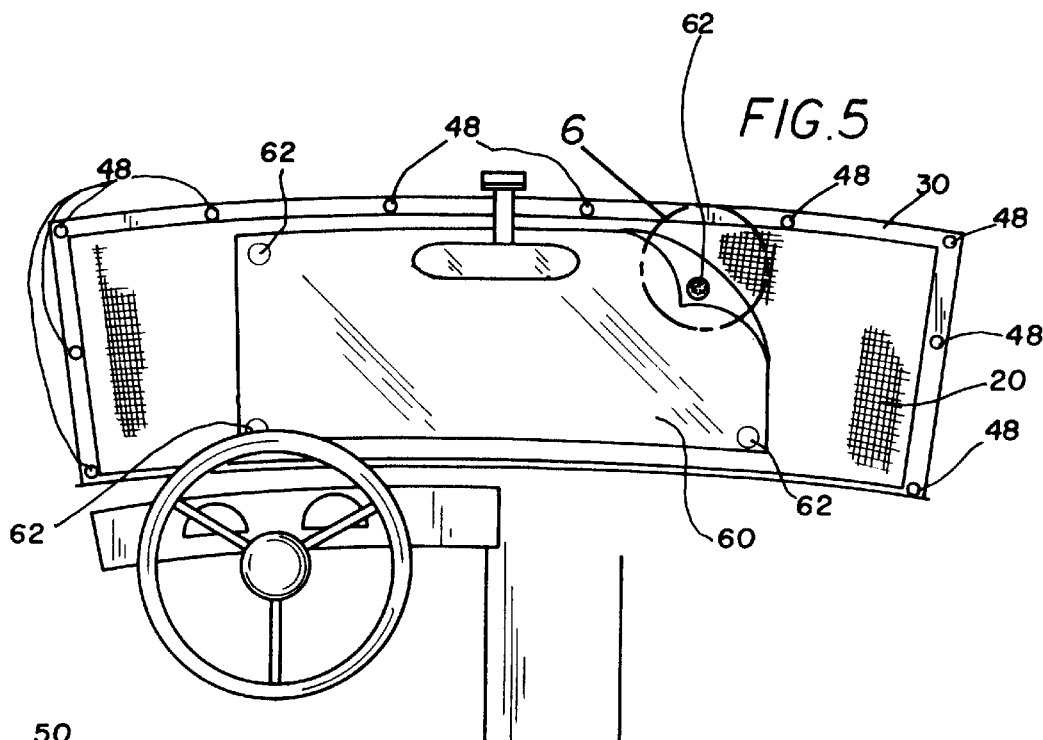
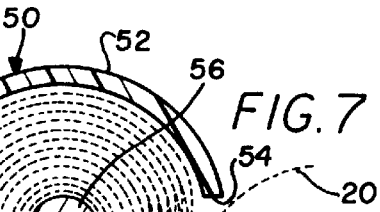
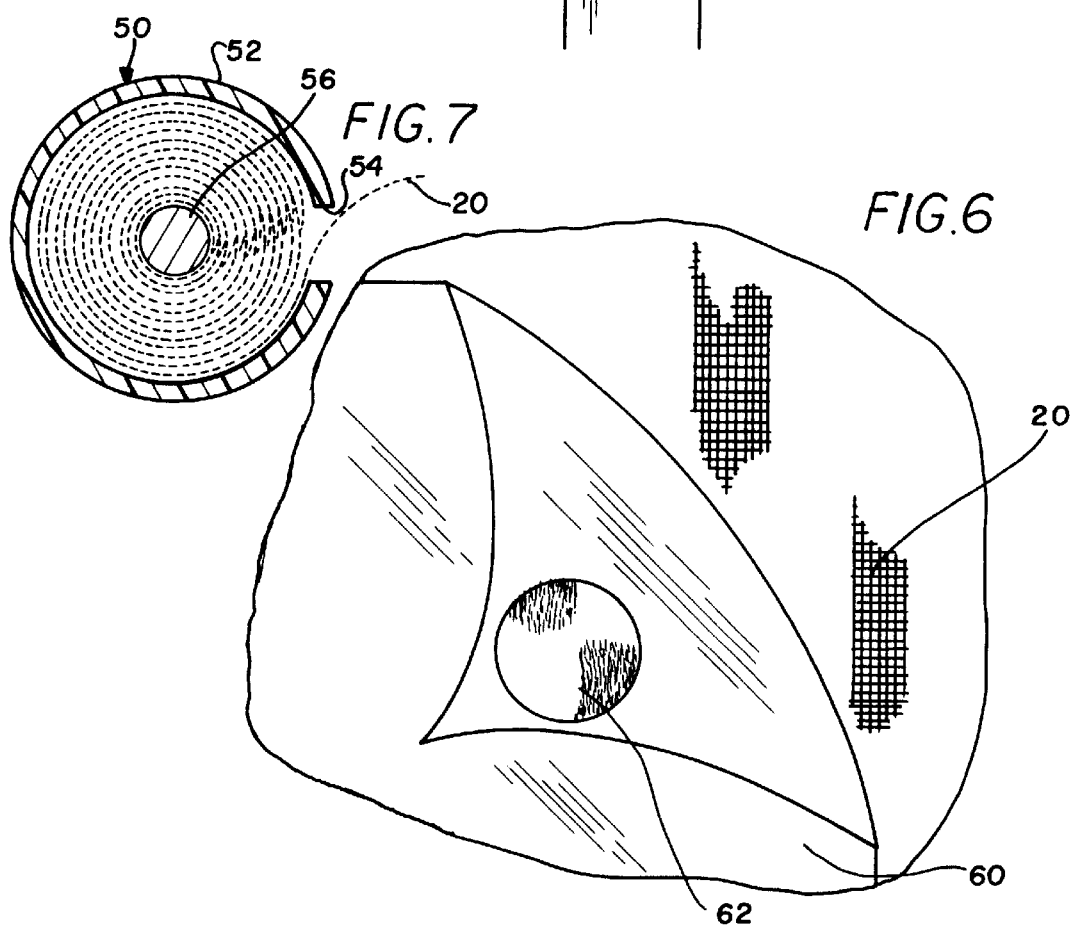

5,992,498

REMOVABLE VEHICLE WINDOW SECURITY SCREEN SYSTEM

BACKGROUND OF THE INVENTION

1. Field of the Invention

The present invention relates to Vehicle Window Screen Devices and more particularly pertains to a new Removable Vehicle Window Security Screen System for providing adequate ventilation to a vehicle without objects within the interior of the vehicle flying out through a window and for reducing debris accumulation within the vehicle.

2. Description of the Prior Art

The use of Vehicle Window Screen Devices is known in the prior art. More specifically, Vehicle Window Screen Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Vehicle Window Screen Devices include U.S. Pat. No. 3,960,195; U.S. Pat. No. 4,653,562; U.S. Pat. No. Design 337,297; U.S. Pat. No. 4,913,212; U.S. Pat. No. 4,398,586 and U.S. Pat. No. 4,285,383.

While these devices fulfill their respective, particular objectives and requirements, the aforementioned patents do not disclose a new Removable Vehicle Window Security Screen System. The inventive device includes a reticulated netting formed to a shape of a window opening, a resilient border strip secured to the netting, a plurality of apertures in a window frame, and a plurality of fasteners for projecting through the border strip into the apertures.

In these respects, the Removable Vehicle Window Security Screen System according to the present invention substantially departs from the conventional concepts and designs of the prior art, and in so doing provides an apparatus primarily developed for the purpose of providing adequate ventilation to a vehicle without objects within the interior of the vehicle flying out through a window and for reducing debris accumulation within the vehicle.

SUMMARY OF THE INVENTION

In view of the foregoing disadvantages inherent in the known types of Vehicle Window Screen Devices now present in the prior art, the present invention provides a new Removable Vehicle Window Security Screen System construction wherein the same can be utilized for providing adequate ventilation to a vehicle without objects within the interior of the vehicle flying out through a window and for reducing debris accumulation within the vehicle.

The general purpose of the present invention, which will be described subsequently in greater detail, is to provide a new Removable Vehicle Window Security Screen System apparatus and method which has many of the advantages of the Vehicle Window Screen Devices mentioned heretofore and many novel features that result in a new Removable Vehicle Window Security Screen System which is not anticipated, rendered obvious, suggested, or even implied by any of the prior art Vehicle Window Screen Devices, either alone or in any combination thereof To attain this, the present invention generally comprises a reticulated netting formed to a shape of a window opening, a resilient border strip secured to the netting, a plurality of apertures in a window frame, and a plurality of fasteners for projecting through the border strip into the apertures.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new Removable Vehicle Window Security Screen System apparatus and method which has many of the advantages of the Vehicle Window Screen Devices mentioned heretofore and many novel features that result in a new Removable Vehicle Window Security Screen System which is not anticipated, rendered obvious, suggested, or even implied by any of the prior art Vehicle Window Screen Devices, either alone or in any combination thereof.

It is another object of the present invention to provide a new Removable Vehicle Window Security Screen System which may be easily and efficiently manufactured and marketed.

It is a further object of the present invention to provide a new Removable Vehicle Window Security Screen System which is of a durable and reliable construction.

An even further object of the present invention is to provide a new Removable Vehicle Window Security Screen System which is susceptible of a low cost of manufacture with regard to both materials and labor, and which accordingly is then susceptible of low prices of sale to the consuming public, thereby making such Removable Vehicle Window Security Screen System economically available to the buying public.

Still yet another object of the present invention is to provide a new Removable Vehicle Window Security Screen System which provides in the apparatuses and methods of the prior art some of the advantages thereof, while simultaneously overcoming some of the disadvantages normally associated therewith.

Still another object of the present invention is to provide a new Removable Vehicle Window Security Screen System for providing adequate ventilation to a vehicle without objects within the interior of the vehicle flying out through a window and for reducing debris accumulation within the vehicle.

Yet another object of the present invention is to provide a new Removable Vehicle Window Security Screen System which includes a reticulated netting formed to a shape of a window opening, a resilient border strip secured to the netting, a plurality of apertures in a window frame, and a plurality of fasteners for projecting through the border strip into the apertures.

Still yet another object of the present invention is to provide a new Removable Vehicle Window Security Screen System that can be utilized as a temporary window in the event a window is broken.

Even still another object of the present invention is to provide a new Removable Vehicle Window Security Screen System that allows the user to travel in comfort without utilizing a conventional air conditioner within the vehicle.

Another object of the present invention is to provide a new Removable Vehicle Window Security Screen System that prevents the accumulation of outside debris within the interior portion of the vehicle.

Another object of the present invention is to provide a new Removable Vehicle Window Security Screen System that allows cigarette smoke within the vehicle to escape thereby providing fresher air for individuals within the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new Removable Vehicle Window Security Screen System according to the present invention.

FIG. 2 is a magnified side view of the present invention.

FIG. 3 is a side view of the present invention.

FIG. 4 is a magnified upper perspective view of the present invention from FIG. 3 disclosing the securing means.

FIG. 5 is a front view of the present invention attached to a perimeter of a windshield and a sun screen member removably attached to the netting.

FIG. 6 is a magnified view from FIG. 5 of the drawings disclosing the hook and loop fastener.

FIG. 7 is a cross sectional view along line 7—7 from FIG. 3 of the drawings.

DESCRIPTION OF THE PREFERRED EMBODIMENT

With reference now to the drawings, and in particular to FIGS. 1 through 7 thereof, a new Removable Vehicle Window Security Screen System embodying the principles and concepts of the present invention and generally designated by the reference numeral 10 will be described.

More specifically, it will be noted that the Removable Vehicle Window Security Screen System 10 comprises a reticulated netting 20 formed to a shape of a window opening 14 of a vehicle 12, a resilient border strip 30 attached to the reticulated netting 20, and a securing means 40 for removably attaching the resilient border strip 30 to a window frame 16 surrounding the window opening 14 of the vehicle 12 for preventing removal of the reticulated netting 20 thereby preventing theft within the vehicle 12 or debris collection within the vehicle 12.

As shown in FIGS. 3 through 5 of the drawings, the securing means 40 comprises a plurality of grommets 32 secured distally within the resilient border strip 30 for receiving a corresponding fastener 48. A plurality of apertures 42 project into the window frame 16 corresponding to the plurality of grommets 32 for receiving the corresponding fastener 48 as best shown in FIG. 3 of the drawings. A plurality of passages 44 project into the window frame 16 extending from and connected to the corresponding plurality of apertures 42 as best shown in FIG. 4 of the drawings. A diameter of the apertures 42 is slightly larger than a diameter of the fastener 48 for providing a snug fit of the fastener 48 within the passage 44. The fastener 48 has a bulbous end 49 as shown in FIG. 4 of the drawings. The fastener 48 also has a flange 41 concentrically secured to the fastener 48 for preventing a complete insertion of the fastener 48 into the aperture and passage 44 and for allowing adequate gripping of the fastener 48 during insertion and removal. A plurality of bulbous cavities 46 are within the window frame 16 connected correspondingly to the plurality of passages 44 opposite of the apertures 42 for catchably receiving the bulbous end 49 of the fastener 48, as shown in FIG. 4 of the drawings, thereby securing the resilient border strip 30 to the window frame 16.

As shown in FIGS. 3 and 7 of the drawings, a storage means 50 is secured to the window frame 16 for winding/unwinding the reticulated netting 20 during respective non-use and use. The storage means 50 comprises an elongated encasement 52 having a lumen and a longitudinal axis. The elongated encasement 52 is preferably secured to the window frame 16 traversely to a longitudinal axis of the vehicle 12. A slot 54 projects into the elongated encasement 52 parallel to the longitudinal axis of the elongated encasement 52 for receiving the reticulated netting 20 and the resilient border strip 30 as shown in FIG. 7 of the drawings. A shaft 56 is rotatably secured coaxial to the longitudinal axis of the elongated encasement 52. The shaft 56 secures the resilient border strip 30 at one end as shown in FIG. 7 of the drawings. A coil spring 58 is secured to an end of the shaft 56 and engages the elongated encasement 52. The coil spring is wound to rotate the shaft 56 for storing the reticulated netting 20 and the resilient border strip 30 within the elongated encasement 52 during nonuse. A handle 34 is secured to an end of the resilient border strip 30 opposite of the shaft 56 for allowing manual removal of the reticulated netting 20 and the resilient border strip 30 from within the elongated encasement 52. As shown in FIGS. 5 and 6 of the drawings, a sun screen member 60 is removably mountable to the reticulated netting 20 by a plurality of pieces of hook and loop fasteners 62 attached mesial the sun screen member 60 and the reticulated netting 20 for preventing sunlight from projecting within an interior portion of the vehicle 12. The sun screen member 60 thereby reduces the temperature within the vehicle 12 thereby providing comfort to a user.

In use, the user manually manipulates the handle 34 for pulling the resilient border strip 30 and the reticulated netting 20 from within the storage means 50. The grommets 32 are aligned with their respective apertures 42 into the window frame 16. Thereafter, the corresponding plurality of fasteners 48 are inserted into the apertures 42 whereby the bulbous end 49 of the fasteners 48 catches within the bulbous cavity 46 thereby preventing removal of the fasteners 48. The resilient border strip 30 is thereafter secured to the window frame 16 of the vehicle 12 thereby preventing access of the interior portion of the vehicle 12 by an unwanted individual. The reticulated netting 20 further provides adequate ventilation within the interior portion of the vehicle 12 thereby preventing accumulation of heat or smoke. The netting 20 further prevents valuable objects within the interior portion of the vehicle 12 from flying out the window opening 14 while driving. The netting 20 also prevents debris from outside of the vehicle 12 from accumulating in the interior portion of the vehicle 12. Also, the user may secure the sun screen member 60 onto the netting 20 for preventing sunlight from entering the interior portion of the vehicle 12 thereby preventing a substantial increase in the temperature of the interior portion of the vehicle 12 and preventing sunlight damage to the interior portion of the vehicle 12. The present invention also reduces the amount of time a conventional air conditioner within the vehicle 12 has to operate in order to maintain a desirable temperature within the vehicle. When finished with the present invention, the user simply removes the plurality of fasteners 48 from within the apertures 42 thereby allowing the resilient border strip 30 to become disconnected with the window frame 16 thereby allowing the unnumbered coil spring to rotate the shaft 56 to wind the netting 20 into a storage position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A removable vehicle window security screen system comprising, in combination:
    a vehicle having a window opening, the window opening having a window frame surrounding the window opening;
    a reticulated netting formed to a shape for covering the window opening of the vehicle, said reticulated netting being adapted to permit airflow therethrough;
    a resilient border strip attached to said reticulated netting; and
    a securing means for removably attaching said resilient border strip and said reticulated netting to the window frame for permitting air to enter said window opening while preventing insertion of a human hand into an interior of the vehicle through the window opening when the reticulated netting is positioned to cover the window opening; and
    wherein said securing means includes
        a plurality of fasteners,
        a plurality of grommets secured distally within said resilient border strip, each grommet being for receiving a corresponding one of said plurality of fasteners,
        a plurality of apertures projecting into said window frame corresponding to said plurality of grommets for receiving said corresponding fastener,
        a plurality of passages projecting into said window frame extending from and connected to corresponding said plurality of apertures, wherein a diameter of said apertures is slightly larger than a diameter of said fastener,
        each of said fasteners including a bulbous end,
        each of said fasteners including a flange concentrically secured to said fastener for preventing a complete insertion of said fastener into said aperture and passage, and
        a plurality of bulbous cavities within said window frame connected correspondingly to said plurality of passages opposite of said apertures for catchably receiving said bulbous end of said fastener thereby securing said resilient border strip to said window frame.

2. The removable vehicle window security screen system of claim 1, including a storage means secured to said window frame for winding and unwinding said reticulated netting during respective nonuse and use.

3. The removable vehicle window security screen system of claim 2, wherein said storage means comprises:
    said window opening has a wider end and a narrower end, said window opening generally tapering from said wider end to said narrower end, said reticulated netting having a wider end and a narrower end generally corresponding to said window opening;
    an elongated encasement having a hollow interior extending radially outward along a longitudinal axis of the encasement, wherein said elongated encasement is secured to said window frame with the longitudinal axis of said encasement in a substantially vertical orientation, said encasement being secured to said window frame adjacent to the wider end of said window opening;
    a slot projecting into said interior of said elongated encasement parallel to said longitudinal axis of said elongated encasement for receiving said reticulated netting and said resilient border strip therethrough;
    a shaft rotatably secured coaxial to said longitudinal axis of said elongated encasement and wherein said shaft secures said reticulated netting at said wider end, said reticulated netting being coiled about said shaft with said narrower end withdrawable through said slot;
    a coil spring secured to an end of said shaft and engaging said elongated encasement, wherein said coil spring is wound to rotate said shaft for storing said reticulated netting and said resilient border strip in said interior of said elongated encasement; and
    a handle secured to said narrower end of said reticulated netting, said handle extending through said slot when said reticulated netting is stored in the interior of said encasement, said handle being for allowing manual removal of said reticulated netting and said resilient border strip from said interior of said elongated encasement.

4. The removable vehicle window security screen system of claim 3, including a sun screen member removably mountable to said reticulated netting by a plurality of hook and loop fasteners attached between said sun screen member and said reticulated netting.

5. A removable vehicle window security screen system comprising, in combination:

a vehicle having a window opening, the window opening having a window frame surrounding the window opening;

a reticulated netting formed to a shape for covering the window opening of the vehicle;

a resilient border strip attached to said reticulated netting; and a securing means for removably attaching said resilient border strip to the window frame for preventing insertion of a human hand into an interior of the vehicle through the window opening when the reticulated netting is positioned to cover the window opening; and wherein said securing means includes
  a plurality of fasteners,
  a plurality of grommets secured distally within said resilient border strip, each grommet being for receiving a corresponding one of said plurality of fasteners,
  a plurality of apertures projecting into said window frame corresponding to said plurality of grommets for receiving said corresponding fastener,
  a plurality of passages projecting into said window frame extending from and connected to corresponding said plurality of apertures, wherein a diameter of said apertures is slightly larger than a diameter of said fastener,
  each of said fasteners including a bulbous end,
  each of said fasteners including a flange concentrically secured to said fastener for preventing a complete insertion of said fastener into said aperture and passage, and
  a plurality of bulbous cavities within said window frame connected correspondingly to said plurality of passages opposite of said apertures for catchably receiving said bulbous end of said fastener thereby securing said resilient border strip to said window frame;

a storage means secured to said window frame for winding/unwinding said reticulated netting during respective nonuse and use;

wherein said storage means includes
  an elongated encasement having a hollow interior extending radially outward along a longitudinal axis of the encasement, wherein said elongated encasement is secured to said window frame transversely to a longitudinal axis of said vehicle,
  a slot projecting into said interior of said elongated encasement parallel to said longitudinal axis of said elongated encasement for receiving said reticulated netting and said resilient border strip therethrough,
  a shaft rotatably secured coaxial to said longitudinal axis of said elongated encasement and wherein said shaft secures said resilient border strip at one end,
  a coil spring secured to an end of said shaft and engaging said elongated encasement, wherein said coil spring is wound to rotate said shaft for storing said reticulated netting and said resilient border strip in said interior of said elongated encasement, and
  a handle secured to an end of said resilient border strip opposite of said shaft, said handle extending through said slot when said reticulated netting is stored in the interior of said encasement, said handle being for allowing manual removal of said reticulated netting and said resilient border strip from said interior of said elongated encasement; and a sun screen member removably mountable to said reticulated netting by a plurality of hook and loop fasteners attached between said sun screen member and said reticulated netting.

* * * * *